United States Patent [19]

Papenhagen et al.

[11] Patent Number: 5,761,967
[45] Date of Patent: Jun. 9, 1998

[54] MOUNTING FRAME OF A VEHICLE CONTROL PEDAL UNIT

[75] Inventors: Dieter Papenhagen, Waiblingen; Manfred Löchle, Stuttgart; Thorsten Mayer, Fellbach, all of Germany

[73] Assignee: Mercedes-Benz AG, Stuttgart, Germany

[21] Appl. No.: 691,820

[22] Filed: Aug. 5, 1996

[30] Foreign Application Priority Data

Aug. 29, 1995 [DE] Germany .................. 195 31 734.3

[51] Int. Cl.⁶ .................................................. G05G 1/14
[52] U.S. Cl. ........................................... 74/513; 74/560
[58] Field of Search ............................ 74/512, 513, 514, 74/560

[56] References Cited

U.S. PATENT DOCUMENTS

| | | | |
|---|---|---|---|
| 2,166,128 | 7/1939 | Castle | 74/513 |
| 2,245,852 | 6/1941 | Castle | 74/513 X |
| 4,218,937 | 8/1980 | Albrecht et al. | |
| 5,063,811 | 11/1991 | Smith et al. | 74/513 |
| 5,497,677 | 3/1996 | Baumann et al. | 74/560 X |

FOREIGN PATENT DOCUMENTS

| | | |
|---|---|---|
| 0 430 600 | 6/1991 | European Pat. Off. |
| 27 28 787 | 1/1979 | Germany. |
| 28 15 769 | 10/1979 | Germany. |
| 3320052 | 10/1984 | Germany .................. 74/560 |
| 4013284 | 10/1991 | Germany .................. 74/512 |
| 792985 | 4/1958 | United Kingdom ......... 74/513 |

*Primary Examiner*—Charles A. Marmor
*Assistant Examiner*—Mary Ann Battista
*Attorney, Agent, or Firm*—Klaus J. Bach

[57] ABSTRACT

In a mounting frame of a vehicle control pedal unit in which a pedal lever is pivotally supported at one end in a pivot support structure arranged at the end of the mounting frame, the mounting frame has at least first and second mounting structures disposed at its back wall and the first mounting structure is disposed at the end of the mounting frame adjacent the pivot support structure and the second mounting structure is disposed at the opposite end of the mounting frame and includes two spaced recesses receiving two tongues projecting from the vehicle body structure and a bolt extending through aligned bores formed in the mounting frame and in the tongues for firmly connecting the mounting frame to the vehicle body structure.

7 Claims, 3 Drawing Sheets

MOUNTING FRAME OF A VEHICLE CONTROL PEDAL UNIT

BACKGROUND OF THE INVENTION

The invention relates to a mounting frame of a vehicle control pedal unit in which a vehicle control pedal is pivotally supported and which has a rear wall with at least two mounting means for mounting the frame to a vehicle wall, particularly the vehicle splash wall.

EP 0 430 600 B1 discloses a vehicle control pedal mounting frame on which several control pedals are supported and which has several mounting structures at its rear wall for mounting the frame to a vehicle component. It includes a rear wall with forwardly extending wall portions which include pedal support structures the pedals being pivotally supported between forwardly projecting gussets with mounting means spaced from the rear wall for attaching the mounting frame to a stationary vehicle component.

For further background prior art, reference is made to DE 28 15 769 A1, DE 27 28 787 A1, DE 42 26 352 A1 and to U.S. Pat No. 4,218,937.

It is the object of the present invention to provide a mounting frame of a vehicle control unit of such a design that it is easy and inexpensive to manufacture and to install in a vehicle.

SUMMARY OF THE INVENTION

In a mounting frame of a vehicle control pedal unit in which a pedal lever is pivotally supported at one end in a pivot support structure arranged at an end of the mounting frame, the mounting frame has at least first and second mounting means disposed at its back wall and the first mounting is disposed at the end of the mounting frame adjacent the pivot support structure and the second mounting means is disposed at the opposite end of the mounting frame and includes two spaced recesses receiving two tongues projecting from the vehicle body structure and a bolt extending through aligned bores formed in the mounting frame and in the tongues for firmly connecting the mounting frame to the vehicle body structure.

The support frame according to the invention can be installed substantially more easily than the support frames known so far so that installation is also less expensive since, for the first mounting means, a plug-in connection is provided for the mounting frame and, for the second mounting means a simple bolt is used to hold the mounting frame in position. If the first mounting means is a pin received in a hole the support frame mounting arrangement is especially simple.

With a multi-link pedal support wherein an end of the link is received in a pocket in the mounting frame, the support for the pedal is easily installed since the end of the link can be easily mounted. A clip connection may be provided by forming the last link in the form of a clip and the pocket in the mounting frame as a clip receptacle.

There may also be provided a vehicle body-mounted retaining pin which extends into the pocket and through the last link when the mounting frame is installed in the vehicle.

The second mounting means may be a mounting plate with two spaced projections received in openings formed in the mounting frame and locked therein by a bolt inserted through the mounting frame and the projections. Such a one piece mounting plate may be pre-mounted to the vehicle body and may include the retaining pins for the multi-link pedal support. Upon installation of the mounting frame and the control pedal both are firmly positioned by a single mounting structure.

The mounting frame however may also include a pin which is received in a pin receptacle mounted on the vehicle body. Preferably, such a pin is integrally formed with the mounting frame which consists of plastic.

If the pin connection is arranged above the second mounting means installation is facilitated since at the inaccessible end the mounting frame can then simply be inserted into the pin receptacle, whereas the bolt connection is to be established at the lower, easily accessible end of the mounting frame.

The invention and further advantages thereof will become more readily apparent from the following description of a preferred embodiment.

DESCRIPTION OF A PREFERRED EMBODIMENT

Figure 1:
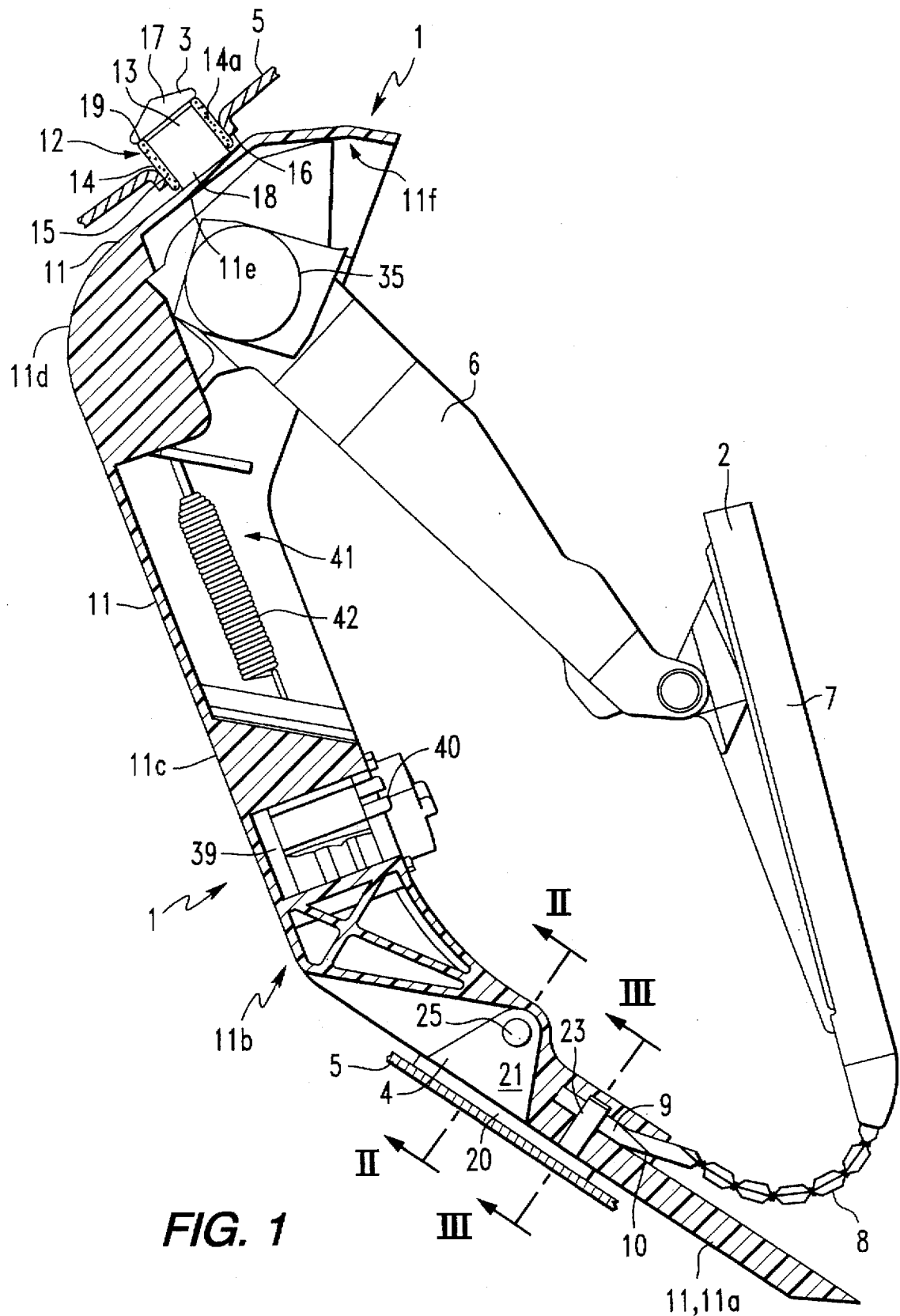
FIG. 1 is a longitudinal cross-sectional view of the mounting frame according to the invention with a pedal lever with pedal installed wherein the mounting frame has two mounting means and the control pedal is pivotally supported on the mounting frame and comprises a pedal lever, a pedal and a multi-link coupling whose end is received in a pocket formed in the mounting frame and is retained therein by a retaining pin.

FIG. 1 shows the mounting frame 1 in longitudinal cross-section wherein a control pedal lever 2 is pivotally mounted thereon and the mounting frame 1 is provided, at its rear wall 11, with mounting means 3 and 4 by which it can be mounted on a mounting structure 5 of a vehicle.

The control pedal 2 comprises several parts. It includes a pedal lever 6 which is pivotally supported on the mounting frame 1 and a foot pedal 7 which is linked to the peal lever 6 and has attached thereto a multi-link coupling 8 whose end piece 9 is received in a pocket 10 of the mounting frame 1 and is removably fastened therein by retaining pins 23, 24.

The mounting structure 5 on the vehicle body on which the mounting frame is supported is preferably the splash wall which, together with part of the floor of the vehicle, (not shown) defines the leg room of the vehicle.

The first mounting means 3 is a pin-type insert connection 12 wherein as shown in FIG. 1, the pin is integrally formed with, and projects from, the rear wall 11 of the mounting frame 1 so as to form a clip 13 which is snapped into an opening 14 in the vehicle mounting structure 5. Between the clip 13 and the walls of the opening 14, there is disposed a rubber sleeve 15 which serves to better retain the clip 13 and to accommodate tolerances. The opening 14 and the rubber sleeve 15 form a clip receptacle 14a. The opening 14 is provided with a bent-over flange 16 by which the rubber sleeve 15 is supported. The clip 13 is provided with a cone-like tip 17 with a large cone angle, and has a cylindrical body portion 18 which is firmly connected to, or part of, the mounting frame 1. The diameter of the cylindrical body portion 18 is smaller than the diameter of the base circle of the cone-like tip 17 so as to form a retaining shoulder 19 for the rubber sleeve 15.

The second mounting means 4 comprises a support plate 20 which is mounted onto the vehicle mounting structure 5. Two spaced tongues 21, 22 and also retaining pins 23, 24 project from the mounting plate 20 in a direction normal to the mounting plate 20. The mounting frame 1 has recesses in which the tongues 21, 22 are received when the mounting frame is installed in the vehicle and a mounting bolt 25 is inserted through bores 26–28 formed in the mounting frame 1 and through bores 29, 30 formed in the tongues 21, 22 (see FIGS. 2 and 3).

For installation of the mounting frame 1 and the pedal pre-mounted thereon the mounting frame clip 13 is first inserted into the rubber sleeve 15 disposed in the opening 14. In this way, the mounting frame 1 is fixed by the mounting structure 5 on the vehicle body in a direction transverse to the insert direction and needs to be engaged only to prevent the release of the mounting frame. This task is accomplished by the second mounting means 4 by firmly engaging the mounting frame 1 including the clip 13 with the vehicle body mounting structure 5. In addition, the second mounting means 4 firmly engages the mounting frame 1 with the vehicle body mounting structure 5 and prevents movement of the mounting frame 1 by pedal forces. For installation of the second mounting means 4, the bores 26–28 in the mounting frame 1 are positioned so as to be in axial alignment with the holes 29, 30 in the tongues 21, 22 and a mounting bolt 25 is then inserted. At the same time, the retaining pins 23, 24 are inserted into bores 33, 34, while the end piece 9 of the link coupling 8 is disposed in the pocket 10, and the pins 23, 24 extend through bores 33, 34 in the end piece 9 of the link coupling 8 for retaining the link coupling 8 in engagement with the mounting frame 1.

With the two tongues 21, 22 including the mounting bolt 25 of the mounting means 4 and the clip connection (13–15), the mounting frame 1 is firmly supported and retained at three points.

The insert connection 12 is disposed in the installation position of the mounting frame 1 geodetically above the second mounting means 4 and the clip 13 which is disposed at the rear wall 11 of the mounting frame 1 is arranged in the area of the pivot bearing 35 of the pedal arm 6 on the mounting frame 1.

The shape of the mounting frame 1 preferably conforms to the shape of the splash wall so that the mounting frame 1 has essentially the shape of the sickle bar. In the arrangement as shown in FIG. 1, the mounting frame 1 extends from the bottom first to the left in a straight section 11a at an angle (installed) of about 35 degree to a horizontal line and then extends further upwardly, after a bend 11b in another straight section 11c at an inclination angle of about 70°. In the area of the pivot bearing 35, the section 11c of the rear wall 11 extends to a rounded section 11d and then to a straight section 11e and to a final straight section 11f which extends almost parallel to a horizontal plane. The angle defined between the section 11e and the section 11c is about 115°.

The rear wall 11 has in the sections 11a to 11f forwardly extending side walls 37, 38. The pivot bearing 35 is disposed in the area of the sections 11d–11f and is partially formed by the side walls 37, 38.

Between the side walls 37, 38 about in the center of the mounting frame 1, there is provided a recess 39 for the reception of a kick-down switch 40 (see FIGS. 2 and 3) or of an end position sensor for the pedal 2. Above the recess 39, the mounting frame 1 includes between the side walls a space 41 for the reception of the pedal return spring or springs 42 and of the pedal lever 6.

In a preferred embodiment, the mounting frame 1 and the pedal 2 including pedal lever 6 and foot pedal 7 and also link coupling 8, all consist of plastic but some or all of the components may be aluminum injection castings or they may be made of another commonly used material.

Figure 2:
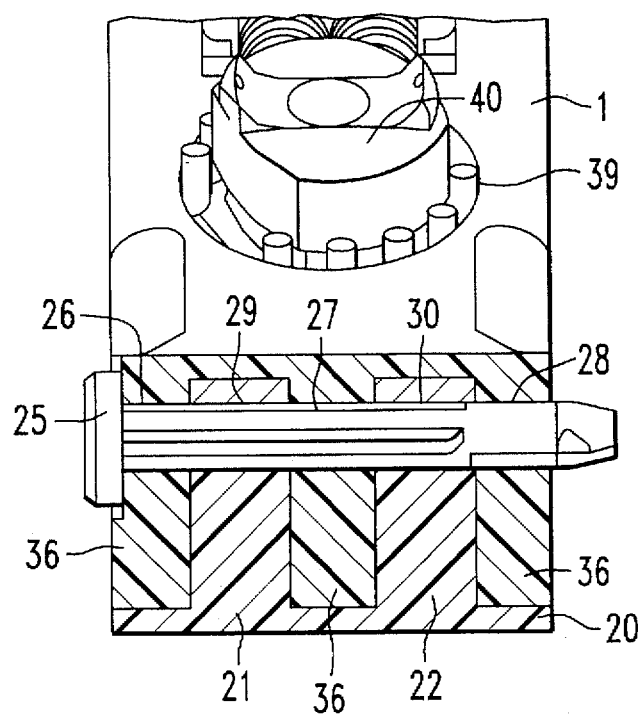
FIG. 2 is cross-sectional view taken along line II—II of FIG. 1.

FIG. 2 is a cross-sectional view taken along line II—II of FIG. 1 and showing the second mounting means 4. The support plate 20 carries the two tongues 21, 22 which project from the support plate 20 normally thereto. They are surrounded and engaged by a frame portion 36 which includes bores 26, 27, 28. For mounting the mounting frame 1 to the mounting structure 5, the bores 26, 27, 28 are brought into axial alignment with the bores 29, 30 of the tongues 21, 22. Then the mounting bolt 25 is inserted through the bores 26–30 whereby the mounting frame 1 is firmly connected to the vehicle body-mounted mounting structure 5. Identical components are designated by the same reference numerals.

Figure 3:
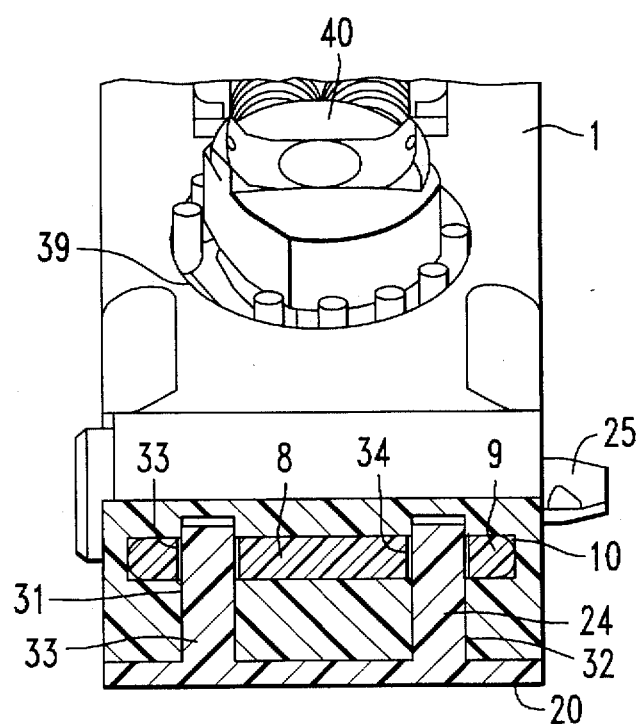
FIG. 3 is a cross-sectional view taken along line III—III of FIG. 1.

FIG. 3 is a cross-sectional view taken along line III—III of FIG. 1 showing the mounting of the link coupling 8. When the mounting frame 1 is installed in a vehicle body and the link coupling 8 is inserted in the pocket 10, the two retaining pins 23, 24 extend through the guide openings 31, 32 of the mounting frame 1 and through the bores 33, 34 of the link coupling 8 in the pocket 10. Identical components are designated in FIGS. 1 and 2 by the same reference numerals.

Figure 4:
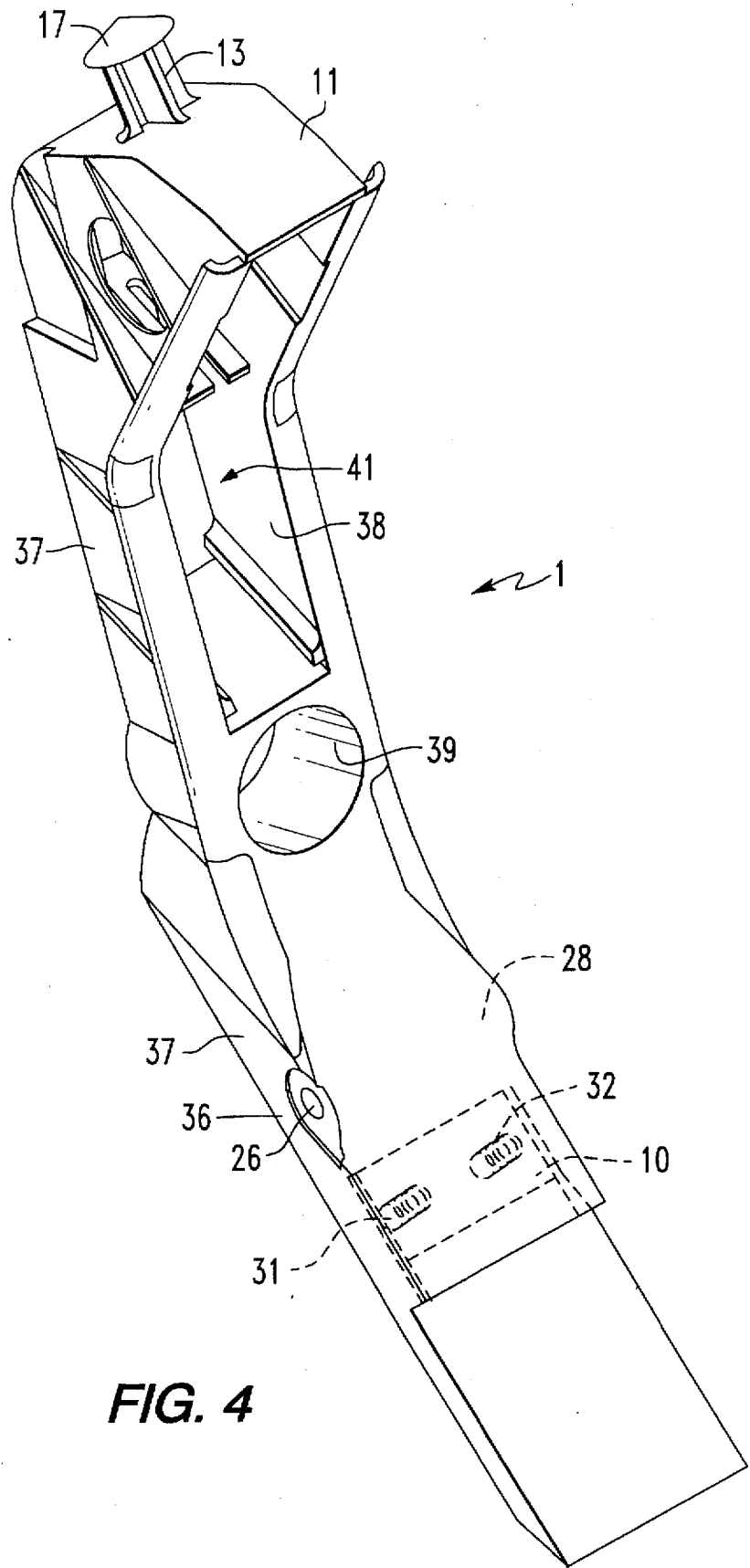
FIG. 4 is a perspective view of the mounting frame.

FIG. 4 is a perspective view of the mounting frame according to the invention; it uses the same reference numerals as used in FIGS. 1–3 for identical components.

The invention is not limited to the embodiment described. For example, the mounting frame may be provided with a pedal arm to which the pedal is firmly mounted that is the pedal is not linked at its bottom end to the mounting frame or the vehicle floor.

Also, the retaining pins and the tongues do not need to be arranged on a support plate but they can be part of, or directly mounted on, the vehicle body structure.

Furthermore, the rubber sleeve may include a rubber boot which receives the upper part of the mounting frame when it is installed in a vehicle.

What is claimed is:

1. A mounting frame of a vehicle control pedal unit, comprising a pivot support structure arranged at one end of said mounting frame pivotally supporting a pivotal pedal lever, said mounting frame having a back wall with at least first and second mounting means for mounting said mounting frame to a vehicle body structure, said first mounting means being disposed in the area of said pivot support structure and comprising an insert structure received in an opening formed in said vehicle body structure and said second mounting means comprising at least two spaced recesses receiving two tongues projecting from the vehicle body structure and a bolt extending through aligned bores formed in said mounting frame and said tongues for firmly connecting said mounting frame to said vehicle body structure.

2. A control pedal unit mounting frame according to claim 1, wherein said pedal lever has a pedal pivotally attached to its free end opposite its pivotal support end and a multi-link coupling extends from said pedal lever and has an end piece received in a corresponding pocket formed in said mounting frame for linking said pedal to said mounting frame.

3. A control pedal unit mounting frame according to claim 2, wherein at least one retaining pin projects from said vehicle body structure and extends through bores formed in the back wall of said mounting frame and in said link coupling end piece.

4. A control pedal unit mounting frame according to claim 1, wherein said insert structure comprises a pin clip integrally formed with said mounting frame and said vehicle body structure is provided with a pin receptacle adapted to receive and engage said pin clip.

5. A control pedal unit mounting frame according to claim 4, wherein said pin receptacle includes a rubber sleeve into which said pin clip is insertable.

6. A control pedal unit mounting frame according to claim 1, wherein said insert structure is disposed geodetically above said second mounting means.

7. A control pedal unit mounting frame according to claim 1, wherein said second mounting means includes a support plate and said tongues project from said support plate for mounting said mounting frame to said support plate, said support plate being firmly mounted to a body structure of said vehicle.

* * * * *